Sept. 25, 1956          A. VOGT          2,763,896
METHOD OF HOMOGENIZING PLASTIFIABLE MASSES
Filed Sept. 29, 1952
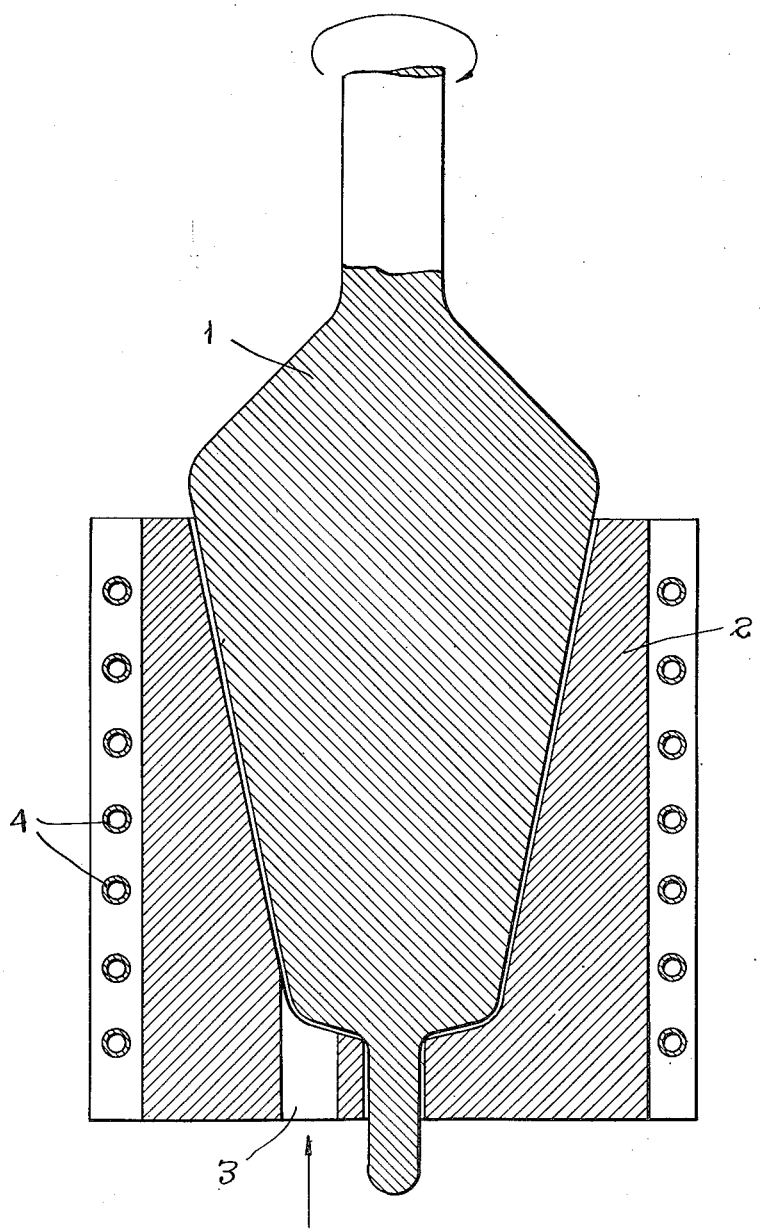
Inventor
ADOLF VOGT
By D. Malcolm
Attorney

2,763,896

METHOD OF HOMOGENIZING PLASTIFIABLE MASSES

Adolf Vogt, Munich, Germany, assignor to Wacker-Chemie G. m. b. H., a corporation Application September 29, 1952, Serial No. 312,039

3 Claims. (Cl. 18—48)

This invention relates to the art of homogenizing plastifiable masses by subjecting same to thorough mechanical working, kneading and mixing, and it has for its object to provide a novel and improved method for this purpose.

Another object of the invention is to provide a more efficient and economical method for homogenizing plastifiable masses than any heretofore known.

Still another object is to accomplish the above and other advantageous results in a single continuous handling or passage of the material through a machine.

Various other objects and advantages will be apparent as the nature of the invention is more fully disclosed.

The usual method of mechanically effecting changes in the state of plastifiable masses by rolling, which is still employed in the artificial rubber and gum industries, is to force the material through the space or slit between the outer peripheral surfaces of two axially-parallel more or less closely spaced rolls. In passing the material through such a roll slit, which is linearly bounded or defined by two lines located opposite each other on the surfaces of the two rolls, it is extremely difficult to effect the plastification, softening, thorough kneading and thorough mixing of the total mass of material passing between the rolls. Actually, it is necessary to pass and re-pass the material through the roll slit a number of times, which means removing the material from one side of the slit and putting it in again on the other side. It is also necessary to cut up the material which wraps itself around the roll surface like a skin, then loosen it, and then put together the "skin" so obtained before it can be re-introduced into the roller slit.

Of course, the effect of the roller slit on the plastifiable material can be modified in various ways, for example by varying the width of the slit, or by special formation of the peripheral surfaces of the rolls, or by making the rolls rotate at differential speeds with respect to each other, but experience has demonstrated that such measures never make the rolling so effective as to insure the proper softening, mixing, etc. of the total mass of material in a single passage through the machine. Furthermore, repeated passage of the material through the machine is unsuited to present-day practice because it is too complicated, time-consuming and expensive; and it is additionally entirely useless in all cases where absolute continuity of the homogenizing process and subsequent treatment of the homogenized material are important.

The present invention avoids the foregoing disadvantages of the prior art by providing a novel method for accomplishing the desired change in the state of the material under treatment in a single continuous operation.

In carrying out the invention, the mass of plastifiable material under pressure, and if necessary while heated, is introduced centrally into a restricted space between working surfaces which are entirely or approximately axially identical and are arranged opposite each other, while said working surfaces are subjected to a motion relatively to each other about their common axis; for example one of said working surfaces may be held stationary while the other is rotated; as a result of which the mass of material in its passage through the operating space or slit is subjected to a constantly changing and mutually superposed or overlapping treatment. As a result the material is continuously pressed, kneaded, pulled, drawn lengthwise and sidewise more and more skin-like, widened, stretched, then torn into a large number of pieces, and then finally twisted into individual pieces like a cord.

The principal advantage of the invention, which has been repeatedly tested and proven in the treatment of polyvinyl chloride masses and other artificial materials, is that the kneading, softening and thorough mixing, etc., are accomplished with a single passage through the slit. In the said slit or working space, which is not linear, but is rather of large-surfaced form, the invention subjects the material under treatment to several effects, and in fact to a combination or sequence of effects, not heretofore known in the art. These are mainly pressure and heat effects, roller and rolling effects, stretching effects, tearing effects, and finally also twisting or torsional effects. Practiced on the material being treated in one and the same passage, experience has repeatedly demonstrated that all of these effects contribute to the manufacture of a product which may be subjected to subsequent operations and handling, thus rendering possible a continuous working.

In carrying out the invention a more or less tapered roller body, and a surrounding hollow body with a correspondingly formed interior surface, are suitable. The cone angle may be optional in dimension. The size of the cone angle is itself optional; it may form the covering line for the body with an angle of say 0°, or a full or nearly full 90°, in which latter case the roller bodies resemble entirely, or almost entirely, disks.

Although the novel features which are characteristic of this invention are set forth more in detail in the claims appended hereto, the nature and scope of the invention may be better understood by referring to the following description, taken in connection with the accompanying drawing forming a part thereof, in which a specific embodiment has been set forth for purposes of illustration.

The drawing is a diagrammatic view, partly in section, of a homogenizing apparatus suitable for carrying out the invention.

In the following description certain specific terms are used for convenience in referring to the various details of the invention. These terms, however, are to be interpreted as broadly as the state of the art will permit.

The homogenizing device shown in the drawing comprises a rotatable conical body or core 1 which is spaced a short distance from the correspondingly shaped conical wall of a surrounding sleeve 2 which may be stationary. The said sleeve 2 contains, adjacent the smaller diameter of body 1, an opening or inlet passage 3 for the plastic mass to be treated, for example a mass of polyvinyl chloride containing a softener.

The sleeve 2 may be heated or cooled if desired, for example by means of a pipe 4 which is suitably mounted on the sleeve and is supplied with steam or liquid in any suitable manner, through of course electric heating may be employed if desired. Two devices like that shown in the drawing may be connected symmetrically, if desired, in order to eliminate the pressure exerted on the core 1 during the homogenizing operation.

The operation is as follows: the plastic mass to be homogenized is introduced into the inlet passage 3 in the form of powder or chunks, for example by means of a worm feed. The material thus entering the inlet passage under pressure passes into the narrow restricted conical space or "slit" between the conical core 1 and the conical surface of sleeve 2. As a result of the conical shape thereof the mass is rotated, at a suitable speed of say about 500 R. P. M. as it is moved forward, and during such motion is kneaded and homogenized as previously explained under high pressure. It then discharges in a completely homogenized condition at the large end of the cone. The apparatus may be varied as desired according to the character of the material under treatment. For instance, the body 1 may be made more or less conical, the intermediate space between body 1 and sleeve 2 may be correspondingly arranged, the speed of rotation of body 1 may be regulated, etc. The body 1 may also be provided with projections and the sleeve 2 with corresponding mating depressions in order to increase the homogenizing effect.

Although certain specific features have been shown and described herein for purposes of illustration, it will be evident to those skilled in the art that the invention is capable of various modifications and adaptations within the scope of the appended claims.

The invention claimed is:

1. Method of mechanically homogenizing a plastifiable material which comprises feeding same forward through a restricted but unobstructed substantially cone-shaped space which is continuous and of substantially equal thickness from end to end from the small end to the large end thereof while subjecting said material to a continuous succession of ever-changing pressing, kneading, mixing, stretching and twisting forces, and discharging the material freely from the entire circumference of the end of such cone-shaped space into an unrestricted area.

2. The method according to claim 1 in which the material is fed under pressure.

3. The method according to claim 2 in which said material is heated.

References Cited in the file of this patent

UNITED STATES PATENTS

| | | |
|---|---|---|
| 1,508,109 | Lovejoy | Sept. 9, 1924 |
| 1,988,743 | MacKenzie | Jan. 22, 1935 |
| 2,221,342 | Butler | Nov. 12, 1940 |
| 2,581,031 | Kruzik | Jan. 1, 1952 |

FOREIGN PATENTS

| | | |
|---|---|---|
| 64,882 | Norway | Mar. 7, 1941 |